Oct. 24, 1967  R. C. CAILLET  3,348,516
DEVICE FOR CLAMPING AND LIFTING CARGO HATCH COVERS
Filed May 2, 1966  3 Sheets-Sheet 3
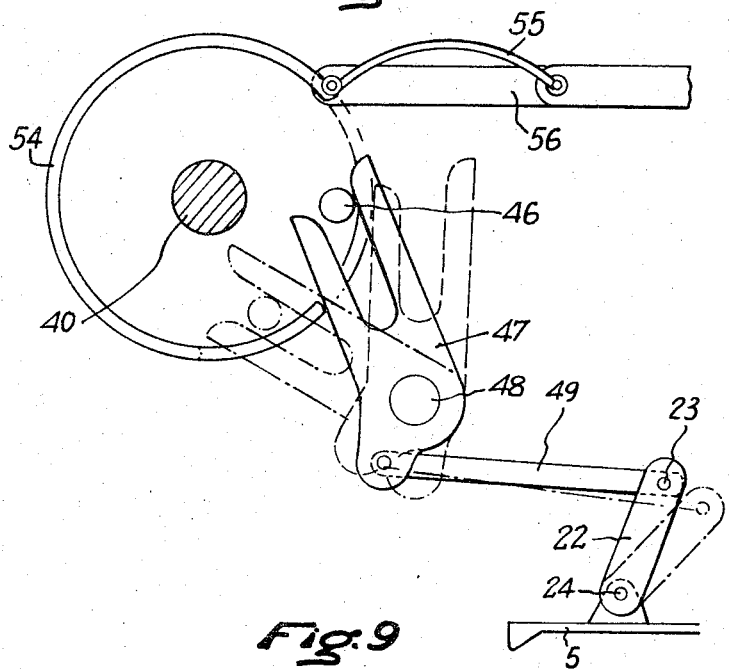
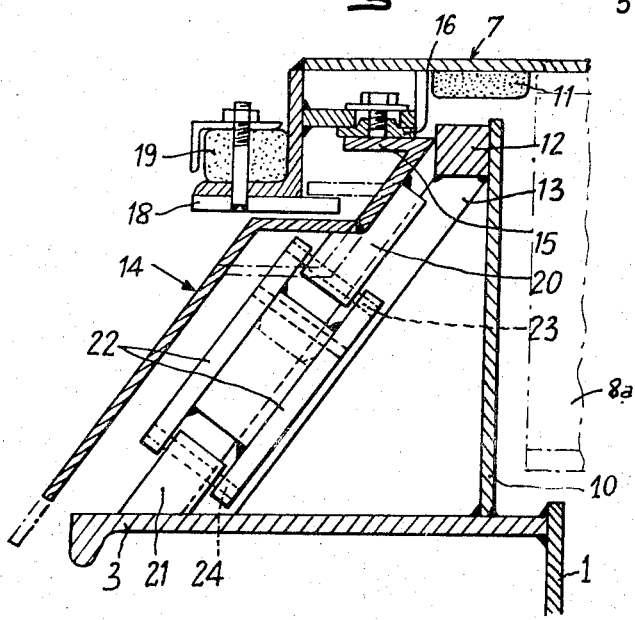
INVENTOR
RENÉ CHARLES CAILLET

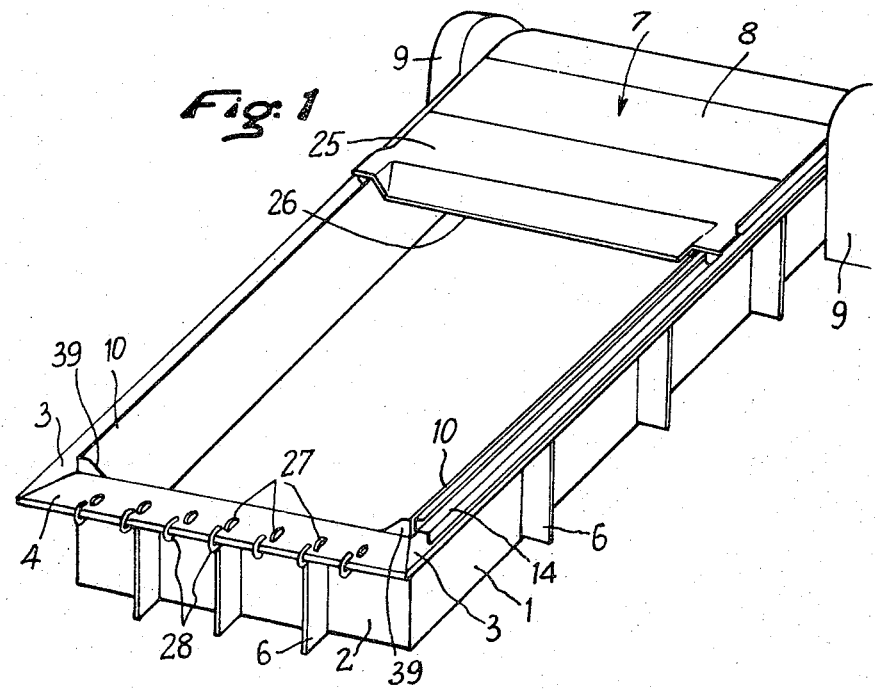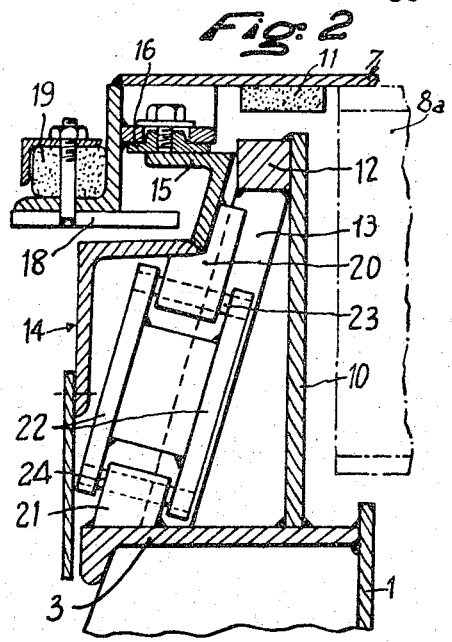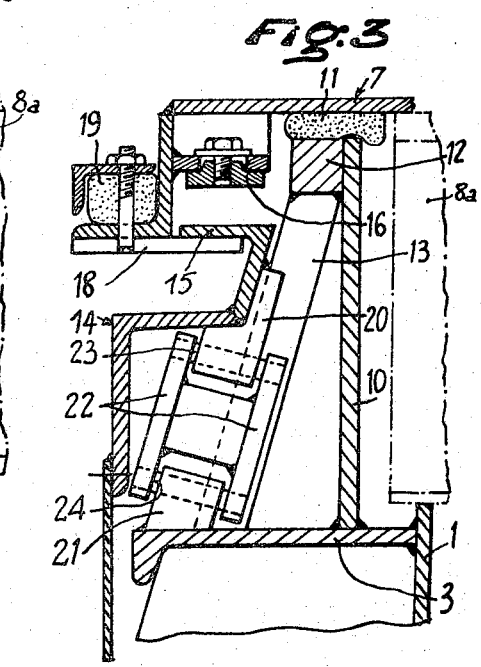

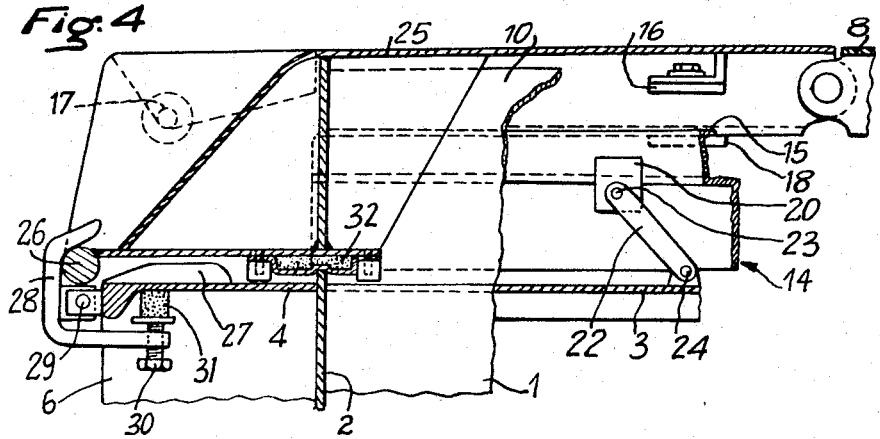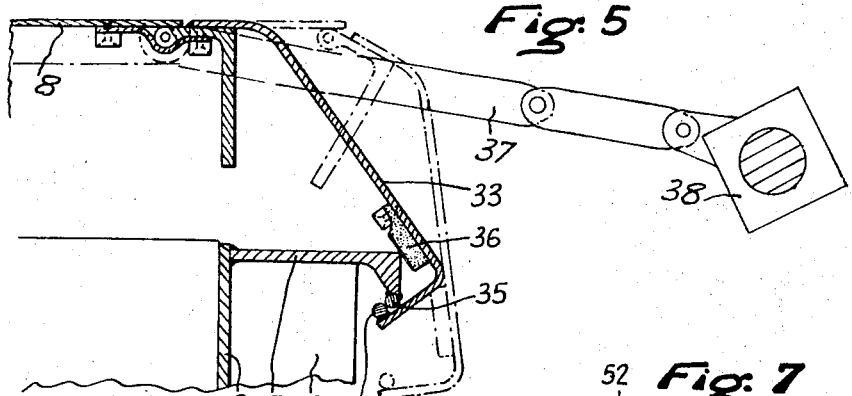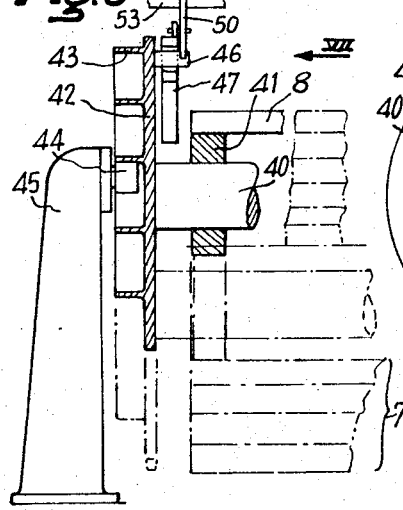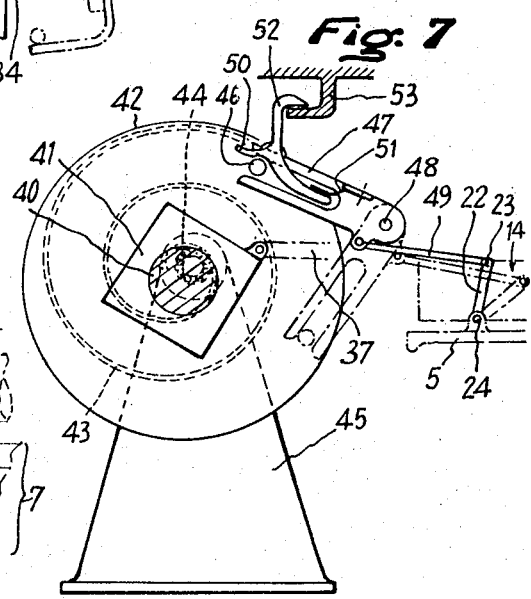

United States Patent Office 3,348,516
Patented Oct. 24, 1967

3,348,516
DEVICE FOR CLAMPING AND LIFTING CARGO HATCH COVERS
René Charles Caillet, 26 Rue de La Republique,
Saint-Germain-en-Laye, Yvelines, France
Filed May 2, 1966, Ser. No. 546,843
Claims priority, application France, May 4, 1965, 15,719
13 Claims. (Cl. 114—202)

ABSTRACT OF THE DISCLOSURE

The present device is for controlling the clamping and lifting of a hatch cover adapted to close a ship's hatch opening provided with a coaming.

Background of the invention

Various types of devices have already been proposed for simultaneously controlling by mechanical power the clamping and lifting of coaming hatch covers, instead of manually operating edge-drawers disposed at spaced intervals along the hatchway periphery.

Hitherto known devices of this type are characterized by a great number of pivots and mechanisms exposed to the detrimental action of sea water, to shocks during handlings and also to the fall of fragments from the cargo being handled. Besides, by very cold weather the operation of these devices is generally impeded by frost.

Objects of the invention

It is the essential object of this invention to avoid the drawback broadly set forth hereinabove by utilizing on either side of the hatchway a longitudinal section acting both as a runway or slideway for the hatch cover and as a means for clamping the hatch cover and transmitting the clamping effort along the entire coaming, this section also acting as a hood protecting the joints of the movable component elements.

This section is connected to the coaming by means of links comprising only two joints, or by means of slideways, in such a manner that the vertical clamping or lifting movement of this section is combined with a horizontal movement thereof which is caused by a longitudinal thrust or pull produced by an actuator such as a fluid-actuated cylinder or the like, without allowing the ice, if any, to interfere with the resulting composite movement.

Moreover, according to this invention the clamping action along the two transverse sides of the coaming results from the movement of the hatch cover without requiring the use of specific power mechanisms, due to a special structure of the coaming and of the end portions of the hatch cover.

Although this invention is applicable to various types of hatch covers, it is applicable with particular advantage to composite hatch covers consisting of a series of transverse metal elements and notably to hatch covers of this type adapted to be rolled up at one end and to be spread by a movement of translation over the coaming.

In the case of roll-up hatch covers the pair of longitudinal sections may be actuated by means of the cover winding winch by using linkage means connected to the ends of the sections adjacent to the winch and actuated by this winch at the end of the unwinding movement and at the beginning of the winding movement.

Description

In order to afford a clearer understanding of this invention and the manner in which the same may be carried out in practice, reference will now be made to the accompanying drawings illustrating diagrammatically by way of example a few forms of embodiment of the invention. In the drawing:

FIGURE 1 is a perspective view showing a hatchway closed by a roll-up hatch cover constructed according to the teachings of this invention;

FIGURE 2 is a fragmentary vertical cross-section showing the hatch cover and the device for clamping and lifting same in a position permitting the unwinding and winding up of the cover;

FIGURE 3 is a section similar to FIGURE 2 but showing the device in its clamping position;

FIGURE 4 is a fragmentary longitudinal section showing the hatchway end farthest from the winding winch;

FIGURE 5 is a fragmentary longitudinal section showing the opposite end of the hatchway;

FIGURE 6 is a fragmentary longitudinal section showing a winding winch;

FIGURE 7 is another view of the winch of FIGURE 6 as seen in the direction of the arrow VII of FIGURE 6;

FIGURE 8 illustrates a modified form of embodiment of the section control winch, and FIGURE 9 is a view similar to FIGURE 2 but showing a slightly different structure.

Referring first to FIGURE 1 the coaming comprises longitudinal and transverse walls 1, 2 disposed in vertical planes, longitudinal horizontal ledges 3 and a horizontal transverse ledge 4 at its end farthest from the winch, the opposite transverse ledge 5 being visible in FIGURE 5. Stiffening ribs are designated by the reference numeral 6.

The hatch cover 7 consists of a series of transverse elements 8, provided with counter-brace 8a, hingedly interconnected so as to be adapted to be spread in a horizontal plane over the coaming and to be folded on one another by being rolled up on a winch drum actuated by power mechanisms enclosed in casings 9.

The hatch cover is clamped in its closed position against the upper edges 10 of the longitudinal walls 1 which are engageable by a gasket 11 carried by the lower face of the cover and engaging likewise reinforcing members 12 welded along said upper edges 10, these reinforcing members 12 being connected if desired through inclined stays 13 to the ledges 3. The main load exerted on the hatch cover is pressed on the top of wall 1 on which is positioned the bottom of counter-brace 8a.

According to this invention, the hatch covers 7 are adapted to be clamped and lifted along each longitudinal side of the coaming by the movement of a section 14 having at its upper end a horizontal flange 15 extending outwards between the cover 7 and the ledge 3 and adapted to be moved between upper and lower bearing members carried by the hatch cover elements. The upper bearing members may consist either of guide-blocks 16 permitting the movements of translation of the hatch cover by sliding, or rollers such as 17 permitting a rolling movement thereof (see FIGURE 4). The lower bearing members are designated by the reference numeral 18 and in this construction it is assumed that they are mounted on the edge of the hatch cover elements with the interposition of resilient pads 19.

The sections 14 carry on their inner side supports 20 connected to other supports 21 connected to the ledges 3 by means of parallel links or shackles 22 pivoted by means of parallel pins 23 and 24 on said supports 20 and 21. These pivot pins 23 and 24 are advantageously inclined in a transverse direction towards the coaming so that when the links 22 are lowered the sections 14 are simultaneously moved longitudinally, transversely outwards and vertically downwards to clamp the hatch cover.

To apply a movement of translation to the hatch covers the links 22 are raised (see FIGURE 2) and sections 14 are thus moved to their uppermost position which is also their position nearest to the coaming, whereby they support the cover 7 in a raised position without producing any frictional contact between the gasket 11 and the coaming. On the other hand, in this position the upper ends of said sections 14 engage the outer faces of reinforcing members 12, thus protecting the space left between said sections 14 and the coaming against the accidental fall thereagainst of cargo fragments.

It will be noted that in the lower position of said links 22 (FIGURE 3) the gasket 11 is clamped by the pressure of flanges 15 against bearing plates 18. In this position, the sections 14 provide a downward extension, without any gap, of the hatch cover peripheral contour, by forming around the coaming sheltered compartments enclosing the links 22 and their pivot pins 23 and 24. Moreover, these compartments are protected against the ingress of sea water and furthermore it will be noted that these sections may comprise a depending skirt projecting downwards beyond the edge of ledges 3.

It may also be noted that in the position illustrated in FIGURE 2 the section 14 engages the reinforcing member 13 while affording the transverse play necessary for the hatch cover movements, but in the position shown in FIGURE 3 the section holds the cover against motion not only in a vertical plane but also in a transverse plane as a consequence of the transverse movement of this section.

FIGURE 4 illustrates the clamping of the endmost element 25 of the hatch cover on the coaming end farthest from the winding winch. This element 25 bears on the flanges 15 of sections 14 by means of rear slide-blocks 16 and front rollers 17 adapted to be moved off the sections at the end of the cover unwinding movement or stroke. At its front end this element 25 carries a round bar 26 adapted to engage the cam faces of guide members 27 carried by the ledge 4 and to fit under hook members 28. These hook members 28 are adapted to pivot through a reduced angle due to the square cross-sectional shape of their pivotal mounting at the end of ledge 4 about pivot pins 29. The permissible angular movement of these hook members 28 being limited in the counterclockwise direction, as seen in FIGURE 4, by a stop adjustable by means of a screw 30 carrying an elastic pad 31 engaging the underface of ledge 4. Moreover, this element 25 carries under its front edge a gasket 32 adapted to engage in a fluid-tight manner the upper edge of wall 2.

When the round bar 26 is engaged under the hook members 28 the gasket 32 is spaced a few millimeters above the edge of wall 2. As the sections 14 are lowered and pressed against the bearing plates 18, the resilient gasket 32 is compressed and the downward pressure exerted by said sections on the bearing plates 18 backwards of wall 2 tends to raise the round bar 26 as a consequence of the lever action thus produced by tilting about the gasket 32. The round bar 26 will thus exert a strong upward pressure against the hook members 28 and lock same while compressing the pads 31.

At its opposite end, the last element 33, FIGURE 5, of the hatch cover depends freely and assumes a position such that its outermost edge 34 engages the underside of a corresponding depending bead 35 of ledge 5. The lower face of this hatch cover element is also provided with a gasket 36 adapted to engage the edge of ledge 5. Upon completion of the hatch cover unwinding movement produced for example by means of side arms 37 connected to the winding winch shown in diagrammatic form at 38, the horizontal movement of the hatch cover tends to raise this element 33 which may be guided through any suitable means. The end ledge 34 is then locked beneath the bead 35 of ledge 5, and gasket 36 is compressed, whereby the hatch cover element 33 is firmly held in its closed position.

It will further be noted that at the hatchway ends, the vertical walls 2 do not project appreciably above the ledges 4 and 5, except in the vicinity of the longitudinal sides where the upper edges of walls 2 are upswept to constitute inclined cam faces for interconnecting the transverse joints to the higher longitudinal joints, as shown in FIGURE 1 at 39. This difference in level is also advantageous in that it permits of sheltering, by means of the coaming 11, the hatch cover which otherwise would tend to be lifted by a lateral green seas.

Although the aforesaid sections 14 can be actuated by a cylinder or like devices designed to this end, it is advantageous in the case of roll-up hatch covers to utilize the winch power for producing this actuation as will be explained presently with reference to FIGURES 6 to 8.

In the example illustrated in FIGURES 6 and 7, the match cover is rotatably connected with a spiral wound sheet member 43 mounted for example on a pair of end discs 42 secured respectively to the ends of a driving shaft 40 carrying on the other hand a square-sectioned drum 41. This spiral sheet 43 is supported by a roller 44 mounted by means of ball-bearings on a bracket 45. With this arrangement, when the discs 42 are rotated the relative engagement of spiral sheet 43 and roller 44 will gradually lower or raise the shaft 40 so that during each complete revolution of discs 42 this shaft 40 will be lowered or raised through a constant stroke which may correspond to the thickness of a hatch cover element so that the various hatch cover elements will be wound up or payed out on or from the drum at a constant level. FIGURE 6 shows in dotted lines the position of the driving shaft 40 when the hatch cover is wound up completely, and in thick lines the position thereof when the cover is unwound completely.

Shortly before the unwinding operation is completed, in the upper position of said winch, a stud 46 carried by the inner face of each disc 42 in the vicinity of its outer periphery engages a corresponding fork member 47 pivoted about a fixed pin 48 and connected through a hinged rod 49 to the first pair of parallel links 22 connected to the relevant section.

The open end of fork member 47 has fulcrumed thereon a lock member 50 formed with a heel urged to its downward position by a spring 51 carried by said fork member 47. This lock member also carries an upper hook-like projection 52 adapted to engage a fixed member 53.

When the stud 46 engages said fork member 47 it moves the heel against the resistance of spring 51, thus releasing the hook 52. Under these conditions, the fork is free and subsequently moved downwards by the stud 46 by pivoting about its axis 48 to the position shown in dotted lines. This movement moves the rod 49 backwards and therefore rotates the links 22 in the clockwise direction as seen in FIGURE 7, thus moving the corresponding section 14.

During the hatch cover winding movement the reverse sequence of operations lifts the fork and raises the sections and the hook 52 resumes its locking position, thus holding the fork until another hatch cover opening cycle is required.

If a conventional-type winding winch having a constant-level drum shaft is used, the hatch cover may also be clamped and lifted by causing a fork 47 to pivot under the control of a stud 46 carried by the winch, as described hereinabove. However, in order to prevent the stud 46 from becoming operative before the last portion of the unwinding movement takes place, the winch may be provided with a circular disc 54 normally engaged by said fork 47. This circular disc comprises a fixed sector of about three-quarters of a circumference, the remaining portion thereof consisting of a pivotally mounted segment 55 solid with the thrust arm 56 connecting the winch to the hatch cover. Thus, at the end of the unwinding operation, this segment 55 is open as a consequence of the movement of said thrust arm 56, thus permitting the lowering of fork 47 and the engagement thereof by the control stud 46.

In the case of a constant-level winch shaft, the hatch cover elements are compulsorily lifted during the initial part of the unwinding movement and must be able to be lowered onto the sections 14 without allowing the bearing plates 18 to be engaged home into the grooves of the sections provided beneath the flanges 15. This result may easily be achieved by giving a more pronounced inclination to the links 22 in order to increase the length of the transverse movement performed by these sections so that, in their upper positions, FIGURE 9, these sections will not interfere with the downward movement of bearing plates 18 externally of said flanges 15.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A device for controlling the clamping and lifting of a hatch cover adapted to close a hatch opening provided with a coaming, said device comprising at least one section extending along the side coamings and between a ledge on the hatch cover and the deck, section control means, and mechanical means connecting said hatch cover to said deck and housed in a sheltered space formed between said section and said coaming, whereby the application of a force from said section control means to longitudinally move said section will impart a movement having a vertical component thereto in order to effect the clamping and lifting of said hatch cover.

2. A device for controlling the clamping and lifting of a hatch cover adapted to close a hatch opening provided with a coaming, said device comprising at least one section extending along the side coamings and between a ledge on the hatch cover and the deck, section control means, and mechanical means connecting said hatch cover to said deck and housed in a sheltered space formed between said section and said coaming, whereby the application of a force from said section control means to longitudinally move said section will impart a movement having a vertical component thereto in order to effect the clamping and lifting of said hatch cover, said coaming having at its transverse ends fixed members and said hatch cover being provided at its transverse ends with retaining locking members, said fixed members being adapted to be engaged by said retaining locking members as a consequence of the movement comprising vertical and horizontal components of said section or sections incorporated in said device.

3. A device for controlling the clamping and lifting of a hatch cover adapted to close a hatch opening provided with a coaming, said device comprising at least one section extending along the side coamings and between a ledge on the hatch cover and the deck, mechanical means including pivoted links connecting said section to a fixed structure, said pivoted links being articulated to said section and fixed structure through pivot pins advantageously inclined downwards towards said coaming, in order to move the pivoted links in a longitudinal plane, said pivoted links and pivot pins being housed in a sheltered space formed between said section and said coaming, whereby the application of a longitudinal force to said section will impart a movement having a vertical component thereto in order to effect the clamping and lifting of said hatch cover.

4. A device for controlling the clamping and lifting of a hatch cover as claim 2, wherein the retaining locking member provided at a transverse end of the hatch cover consists of a tubular member co-acting with corresponding locking means carried by said coaming and comprising guide members and hook members.

5. A device for controlling the clamping and lifting of a hatch cover as claimed in claim 2, wherein the retaining locking member of the second transverse end of said hatch cover consists of a hatch cover element pivoted freely at the end of the hatch cover assembly so as to depend vertically therefrom when the hatch cover assembly is paid out, said hatch cover element carrying at its free end a rod adapted to be engaged underneath the coaming as a consequence of the movement having vertical and horizontal components which is performed by said control device.

6. A device for controlling the clamping and lifting of a hatch cover adapted to close a hatch opening provided with a coaming having its transverse ends located at a lower level than the longitudinal edges protecting the hatch cover against lateral green seas, said device comprising at least one section extending along the side coamings and between a ledge on the hatch cover and the deck, section control means, and mechanical means connecting said hatch cover to said deck and housed in a sheltered space formed between said section and said coaming, whereby the application of a force from said section control means to longitudinally move said section will impart a movement having a vertical component thereto in order to effect the clamping and lifting of said hatch cover, said coaming having at its transverse ends fixed members and said hatch cover being provided at its transverse ends with retaining locking members, said fixed members being adapted to be engaged by said retaining locking members as a consequence of the movement comprising vertical and horizontal components of said section or sections incorporated in said device.

7. A device for controlling the clamping and lifting of a hatch cover as claimed in claim 1, wherein the section control means are actuated by at least one actuator.

8. A device for controlling the clamping and lifting of a hatch cover as claimed in claim 1, applicable to a roll up hatch cover, wherein the section control means are actuated at the end of the hatch cover unwinding movement for producing the clamping effect and at the beginning for releasing the hatch cover.

9. Roll-up hatch cover comprising a device for controlling the clamping and lifting of a hatch cover adapted to close a hatch opening provided with a coaming having its transverse ends located at a lower level than the longitudinal edges protecting the hatch cover against lateral green seas, said device comprising at least one section extending along the side coamings and between a ledge on the hatch cover and the deck, section control means, and mechanical means connecting said hatch cover to said deck and housed in a sheltered space formed between said section and said coaming, whereby the application of a force from said section control means to longitudinally move said section will impart a movement having a vertical component thereto in order to effect the clamping and lifting of said hatch cover, said coaming having at its transverse ends retaining locking members, said fixed members being adapted to be engaged by said retaining locking members as a consequence of the movement comprising vertical and horizontal components of said section or sections incorporated in said device, said section control means being actuated by a fork, a fixed pivot pin, linkage means connecting said fork to said pivot pin, a stud co-acting with said fork is movable at the end or at the beginning of the hatch cover movement and adapted to pivot said fork.

10. Roll-up hatch cover as claimed in claim 9 wherein a winch drum has the hatch cover wound thereon, a spiral sheet member is attached to said drum, a supporting roller co-acts with said sheet member, whereby the rotation of said spiral sheet member on said roller causes the upward or downward movement of the winch drum shaft so that the hatch cover elements being wound or paid out are at a constant level on said winch.

11. Roll-up hatch cover as claimed in claim 9 wherein a winch drum is attached to said studs co-acting with said fork members.

12. Roll-up hatch cover as claimed in claim 9 wherein a winch drum having its axis at a constant level has said hatch cover elements wound thereon whereby the hatch cover elements are at variable levels in relation to the winch drum axis.

13. Roll-up hatch cover as claimed in claim 9 wherein a winch drum attached to said stud is provided with a segment of three quarter circle completed with a movable segment of a quarter circle carried on a thrust arm, said circle being adapted for guiding the fork member, said stud engaging said fork when the movable segment is raised at the end of the hatch cover shutting.

References Cited

UNITED STATES PATENTS 2,945,467   7/1960   Wigeland _____ 114—202

ANDREW H. FARRELL, *Examiner*.